2,966,481

COPOLYMERS OF N-(ACYLAMIDOMETHYL)-ACRYLAMIDES

Neal O. Brace, Woodstown, N.J., assignor to E. I. du Pont de Nemours and Company, Wilmington, Del., a corporation of Delaware No Drawing. Filed Apr. 28, 1955, Ser. No. 504,678

6 Claims. (Cl. 260—86.1)

This invention relates to new derivatives of acrylamides and more particularly to N(acylamidomethyl)acrylamides and polymers thereof.

Heretofore various polymers have been proposed for use as water repellents for a wide variety of textile fabrics including cotton, wool and the new hydrophobic fibers. However, none of them has been found to be entirely satisfactory since they have been found to be either too expensive or else they exhibit poor durability and are not sufficiently hydrophobic.

It is an object of this invention to provide new derivatives of acrylamides and polymers thereof which are capable of imparting a durable, water-repellent finish to textile fabrics. A further object is to provide a process for the preparation of these new acrylamides and polymers thereof. Other objects will appear hereinafter.

These and other objects are accomplished by the new acrylamides having the formula:

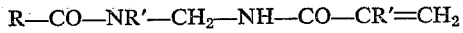

R—CO—NR'—CH$_2$—NH—CO—CR'=CH$_2$ wherein R is a saturated, aliphatic, hydrocarbon radical of from 10 to 20 carbon atoms and R' is a radical selected from the group consisting of hydrogen and methyl radicals. The homopolymers and copolymers of the above recited acrylamides are easily prepared by the use of a free radical initiator.

The N(acylamidomethyl)acrylamides of the present invention are prepared by allowing an N-methylol acrylamide to react with an acrylamide in the presence of a strong acid catalyst and usually in an organic solvent. After the acid is neutralized, the product is isolated and is preferably washed with water to remove the salt and unreacted acrylamide or N,N'-methylenebisacrylamide. The acrylamides are high-melting, crystalline, white solids which are soluble in a variety of common organic solvents. They are sufficiently stable to be recrystallized, and do not decompose readily to give formaldehyde, nor are they readily hydrolyzed. The vinyl groups of the acrylamides are highly activated and polymerization is effected quite readily by contact with a free radical initiator such as α,α'-azobisisobutyronitrile.

After polymerization, the polymers are obtained from solution as non-crystalline solids, higher melting than the monomers. They do not possess sharp melting points, but soften gradually over the range of about 190 to 250° C. They may be redissolved and precipitated in order to remove any impurities such as initiator fragments. Films can be cast from their solutions.

The following examples will better illustrate the nature of the present invention; however, the invention is not intended to be limited to these examples. Parts are by weight unless otherwise indicated.

Example 1.—N(stearamidomethyl)methacrylamide

In a 500 cc. flask was placed 12.75 g. (0.15 m.) methacrylamide, 10.0 g. water 15.0 g. (0.05 m.) purified N-methylolstearamide (M.P. 112° C., from technical grade stearamide) and 100 cc. methylethyl ketone. Technical grade stearamide contains approximately equal amounts of palmitamide and stearamide. The reaction mixture was stirred and heated to 60° C. and acidified with 24% isopropyl alcoholic hydrochloric acid solution to a pH of about 1–2 over a period of 6 hours. The mixture became an almost clear solution. It was diluted with 100 cc. acetone and filtered hot. The filtrate deposited solid which was collected, washed with cold acetone and air dried. It weighed 11.0 g. (58% of theory) and had M.P. (S–105) 108–110° C. When recrystallized from a mixture of acetone and methylethyl ketone, it had M.P. (S–105) 111–113° C. It depressed the M.P. of methylolstearamide to give M.P. (S–105) 108–109° C., and had a distinctive I.R. spectrum. An ethyl alcohol solution decolorized permanganate solution.

Analysis.—Calcd. for $C_{22}H_{42}N_2O_2$: C, 72.10; H, 11.55; N, 7.64%. Found: C, 71.0; H, 11.5; N, 7.3%.

Example 2.—N(stearamidomethyl)acrylamide

In a 2-liter flask was placed 71.0 g. acrylamide (1.0 m.), 1,000 cc. methylethyl ketone, 150 g. (0.5 m.) technical N-methylolstearamide and the mixture heated to 60° C. with stirring in a constant temperature bath. Technical N-methylolstearamide is prepared from technical grade stearamide which contains approximately equal amounts of palmitamide and stearamide. The mixture was made acid to Clayton Yellow paper (pH 1–2) by the addition of 4 cc. of concentrated hydrochloric acid. The mixture grew thick over a 5-hour reaction period. The acid was neutralized by sodium carbonate solution and the solid filtered at 40° C. on a Buchner funnel. The product when dry weighed 142.8 g. and had M.P. 150–151° C. This is a 77% yield.

Analysis.—Calcd. for $C_{21}H_{40}N_2O_2$: C, 71.58; H, 11.44; N, 7.95%. Found: C, 71.7; H, 11.59; N, 7.5%.

Example 3.—N(lauramidomethyl)acrylamide

Thirty grams (0.125 m.) N-methylollauramide (M.P. 108–109° C.) was allowed to react at 60° C. with 17.5 g. (0.25 m.) acrylamide in 125 cc. methylethyl ketone containing 6.0 cc. concentrated hydrochloric acid and 10 cc. water. After 5 minutes, the mixture was very thick and in one-half hour, it was cooled to 45° C. and neutralized with 6.5 cc. 30% sodium hydroxide solution. The solid was collected on a funnel and washed with 150 cc. methylethyl ketone, and then 300 cc. water. The air-dried solid weighed 28.9 g. (86% of theory) and had M.P. (S–150) 153–154° C. On recrystallization from hot benzene, it melted at 157–157.5° C. A mixed M.P. with N,N'-methylenebislauramide was (S–146) 147–150° C.

Analysis.—Calcd. for $C_{16}H_{30}N_2O_2$: C, 68.1; H, 10.7; N, 9.96%. Found: C, 68.4; H, 10.5; N, 9.4%.

Example 4.—Polymer of N(stearamidomethyl)acrylamide

Five grams of the compound of Example 2 in 100 cc. dry benzene was heated to 78° C. to give a solution. α,α'-Azobisisobutyronitrile (0.25 g.) was added as a catalyst and stirring continued for 2½ hours. Some polymer had formed. Another 0.25 g. catalyst was added and heating and stirring continued for a total of 22 hours. The product was a soft gel in benzene. It was soluble in hot chloroform, insoluble in boiling acetone. The dried polymer weighed 5.0 g. and had a M.P. (S–183) 203–218° C. The chloroform solution was viscous when cool and gave a brittle film when evaporated. The polymer was analyzed.

Found: C, 72.4; H, 11.8; N, 7.1%.

Cotton poplin fabric impregnated with a solution of 1.0 g. of the polymer in 50 cc. chloroform had an increase in dry weight of 1.2%. Water repellence was determined by spray ratings in the standard AATCC test. Before curing the fabric had an 80 spray rating, and curing at 180° C. gave a 100 rating.

*Example 5.—Copolymer of N(stearamidomethyl)acrylamide and N(lauramidomethyl)acrylamide*

Ten grams of N(stearamidomethyl)acrylamide of Example 2 (not washed with water and probably containing a little N,N'-methylenebisacrylamide), 10 g. N(lauramidomethyl)acrylamide of Example 3, 100 cc. dry benzene and 0.50 g. α,α'-azobisisobutyronitrile were placed in a flask under nitrogen. The mixture was heated to reflux. Polymerization was rapid, giving a viscous gel in a few minutes. More benzene was added, but the polymer was too viscous to dissolve. The mixture was cooled and the gel scraped out of the flask. The polymer was precipitated by the addition of 300 cc. methanol. The polymer weighed 18.5 g. and melted at 202–210 (clear) to 220° C. where it began to flow.

*Example 6.—Copolymers of N(stearamidomethyl)acrylamide with textile resin monomers*

A slurry of the compound of Example 2 and another comonomer in 250 cc. benzene under nitrogen atmosphere was heated to 80° C. while stirring until a clear solution was formed. A solution of α,α'-azobisisobutyronitrile in benzene was added and stirring continued for 4 hours. Benzene was removed by vacuum distillation during the last 2 hours.

The following table indicates the comonomers and proportions used and the properties of the copolymers obtained. When the resulting polymers were tested according to the procedure of Example 4, they all showed a spray rating after curing of 100.

TABLE I

*Copolymers of n(stearamidomethyl)acrylamide with other monomers*

| Comonomer | Mol. Ratio, acrylamide/ comonomer | Initiator (Wt. percent) | Time (hr.) | Temp., ° C. | Resulting Polymer Softening Range, ° C. |
| --- | --- | --- | --- | --- | --- |
| glycidyl methacrylate | 20:1 | 0.3 | 4 | 80 | 196–202 |
| Do | 10:1 | 0.3 | 4 | 80 | 177–193 |
| Do | 5:1 | 0.3 | 4 | 80 | 167–185 |
| N-hydroxymethylacrylamide | 10:1 | 1.5 | 2 | 80 | 192–210 |

The acrylamides of the present invention are primarily useful as intermediates for the preparation of polymers. These polymers exhibit an excellent, durable water-repellent effect on nylon. The polymers are also useful as water-repellents for cotton and other cellulosic textiles. Their effect on cotton and other cellulosic textiles can be made durable by the formation of copolymers with other textile resin-forming monomers. These textile resin-forming monomers are exemplified by glycidyl methacrylate and methylol acrylamide, both of which contain functional groups which can react with the hydroxyl groups of cellulose or can cross-link adjacent polymer molecules on the fabric surface. Copolymers of 5, 10 or 20 moles of N(stearamidomethyl)acrylamide with 1 mole of either of these monomers, give initial spray ratings of 100 after curing, and 70–90 even after 3 aqueous soap washes. Copolymers of β-dimethylaminoethyl methacrylate quaternized with methyl iodide are also operable.

The polymers can also be coapplied from the same or a separate bath with other resin-forming monomers such as a melamine-formaldehyde resin. The acrylamide polymer is water-insoluble, and so is generally applied from an organic solvent bath. Thus, in the two-bath system, it is possible to apply the melamine-formaldehyde from an aqueous bath.

By the coapplication of a conventional melamine-formaldehyde resin, it is possible to maintain a 100 spray rating even after 3 aqueous soap washes.

The water repellent effect of these polymers can also be improved by the anchor coat method. It has been found that when poly-β-methacrylyloxyethyldiethylmethyl ammonium stearate (as more particularly disclosed in U.S. Patent No. 2,741,568) is applied followed by poly-N(stearamidomethyl)acrylamide, the durability to washing is improved greatly.

As many apparently widely different embodiments of this invention may be made without departing from the spirit and scope thereof, it is to be understood that this invention is not limited to the specific embodiments thereof except as defined in the appended claims.

What is claimed is:

1. A copolymer derived by polymerizing from 5 to 20 molecular parts of a compound having the general formula:

$$R—CO—NR'—CH_2—NH—CO—CR'=CH_2$$

wherein R is a saturated aliphatic hydrocarbon radical of from 10 to 20 carbon atoms and R' is a radical selected from the group consisting of hydrogen and methyl radicals, with 1 molecular part of a monomer selected from the group consisting of glycidyl methacrylate and N-hydroxymethylacrylamide.

2. A copolymer derived by polymerizing from 5 to 20 molecular parts of N-(lauramidomethyl)acrylamide with 1 molecular part of glycidyl methacrylate.

3. A copolymer derived by polymerizing from 5 to 20 molecular parts of N-(lauramidomethyl)acrylamide with 1 molecular part of N-hydroxymethylacrylamide.

4. A copolymer derived by polymerizing from 5 to 20 molecular parts of N-(stearamidomethyl)acrylamide with 1 molecular part of glycidyl methacrylate.

5. A copolymer derived by polymerizing from 5 to 20 molecular parts of N-(stearamidomethyl)acrylamide with 1 molecular part of N-hydroxymethylacrylamide.

6. A copolymer derived by polymerizing from 5 to 20 molecular parts of N-(stearamidomethyl)methacrylamide with 1 molecular part of N-hydroxymethylacrylamide.

References Cited in the file of this patent

UNITED STATES PATENTS

| | | |
| --- | --- | --- |
| 2,259,650 | Maxwell | Oct. 21, 1941 |
| 2,279,497 | Sallmann et al. | Apr. 14, 1942 |
| 2,425,392 | Robinson | Aug. 12, 1947 |
| 2,478,378 | Dickey | Aug. 9, 1949 |
| 2,606,810 | Erickson et al. | Aug. 12, 1952 |
| 2,680,110 | Loughran et al. | June 1, 1954 |
| 2,827,397 | Affleck | Mar. 18, 1958 |
| 2,885,438 | Parret et al. | May 5, 1959 |

OTHER REFERENCES

Magat et al.: 73 J.A.C.S. 1036 (March, 1951).